United States Patent [19]

Salisbury, Jr.

[11] 4,160,508
[45] Jul. 10, 1979

[54] CONTROLLER ARM FOR A REMOTELY RELATED SLAVE ARM

[76] Inventors: Robert A. Frosch, Administrator of the National Aeronautics and Space Administration, with respect to an invention of John K. Salisbury, Jr., Palo Alto, Calif.

[21] Appl. No.: 826,202

[22] Filed: Aug. 19, 1977

[51] Int. Cl.² ............................................. B25J 3/04
[52] U.S. Cl. ..................................................... 414/4
[58] Field of Search .................................... 214/1 CM

[56] References Cited

U.S. PATENT DOCUMENTS

| 3,171,549 | 3/1965 | Orloff | 214/1 CM |
| 3,923,166 | 12/1975 | Fletcher | 214/1 CM |
| 4,046,262 | 9/1977 | Vykukal | 214/1 CM |

*Primary Examiner*—Francis S. Husar
*Assistant Examiner*—George F. Abraham

*Attorney, Agent, or Firm*—Darrell G. Brekke; John R. Manning; Armand McMillan

[57] ABSTRACT

A segmented controller arm configured and dimensioned to form a miniature kinematic replica of a remotely related slave arm. The arm includes a plurality of joints for affording segments of the arm simultaneous angular displacement about a plurality of pairs of intersecting axes, a plurality of position sensing devices for providing electrical signals indicative of angular displacement imparted to corresponding segments of the controller shaft about the axes, and a control signal circuit for generating control signals to be transmitted to the slave arm. The arm is characterized by a plurality of yokes, each being supported for angular displacement about a pair of orthogonally related axes and counterbalanced against gravitation by a cantilevered mass affixed thereto whereby the controller arm may be released without introducing unwanted motion in the slave arm resulting from gravitation of segments of the master arm.

11 Claims, 6 Drawing Figures

CONTROLLER ARM FOR A REMOTELY RELATED SLAVE ARM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention generally relates to manipulator systems and more particularly to an improved, highly efficient controller arm for use in achieving real-time control over a remotely related articulated slave arm.

2. Description of the Prior Art

Master-slave systems, sometimes referred to as remote control manipulators, often are employed in a variety of fields. For example, master-slave systems frequently are used for handling radioactive material, toxic material or other dangerous substances located behind a wall designed to protect an operator of the system. For example, see U.S. Pat. No. 3,815,761. Another field in which a master-slave manipulator system is sometimes employed is in underwater exploration. For example, see U.S. Pat. No. 3,414,136, in which such a system is described. Another field in which master-slave manipulator systems are employed is in the exploration of celestial space. For example, see U.S. Pat. No. 3,893,573.

It should therefore be apparent that the prior art is replete with master-slave manipulator systems characterized by a controller subsystem employed in dictating operation of a slave arm. The master-slave manipulator system which embodies the principles of the instant invention is related to a manipulator system disclosed and claimed in U.S. Letters Patent Application, Ser. No. 436,313, filed Jan. 24, 1974, entitled "AN ANTHROPOMORPHIC MASTER/SLAVE MANIPULATOR SYSTEM", now U.S. Pat. No. 4,046,262.

The manipulator system disclosed in the aforementioned U.S. Application includes a controller arm characterized by an articulated tubular sleeve, often referred to as a brace, into which is inserted an arm of an operator. The sleeve includes electrical signal generating devices which sense motion about joints and provide electrical signals indicative of angular displacement of the sleeve segments initiated in response to motion of the operator's arm. The signals thus generated are transmitted to a remotely related slave arm in which these signals are processed and utilized for angularly displacing segments of the slave arm in a manner substantially duplicating the motion of the operator's arm. Thus the sleeve or brace can, for the sake of convenience, be characterized as a kinematic replica of the corresponding slave arm.

While the controller arm disclosed and claimed in the aforementioned Application for Letters Patent functions quite satisfactorily for its intended purpose, it should be apparent that in some instances, usage of the sleeve is impaired by inherent limitations. For example, in order to employ the system disclosed in the aforementioned application, an operator must insert his arm into the sleeve thereof. In order to appreciate the full advantages of the system, it is necessary that the sleeve be custom-fit to the arm of the operator. Therefore, where an operator for whom the sleeve is designed has an unusually small, large, short or long arm, use of the sleeve by another having an arm of different size is impaired. This results in difficulty being encountered in achieving precise control over the slave arm.

Additionally, the size and weight of the sleeve tend to introduce operational problems. This can be more fully appreciated when it is realized that the sleeve must be supported by an operator substantially throughout the performance of a given task, thus the operator is subjected to fatigue. Fatigue becomes particularly significant in time-delayed manipulation tasks where an operator must hold a segment of the sleeve in a stationary interim position during "waiting periods", sometimes for many minutes.

Further, motion biases which tend to occur in various joints at some arm orientations frequently introduce difficulty in achieving desired motion, without application of excessive force. Such tends to result in false or unwanted motion being introduced into the slave arm.

Finally, since the operator's arm is, in effect, captured inside the sleeve and can only be removed by placing the sleeve in predetermined orientation, the operator may not remove his arm without transmitting control signals to the slave arm. This limitation has a propensity to become particularly serious as emergency conditions are encountered during periods of operation of the system.

It is therefore the general purpose of the instant invention to provide an improved articulated controller arm configured and dimensioned to form a miniature kinematic replica of a remotely related slave arm which overcomes the aforementioned difficulties and disadvantages, without diminishing the effectiveness thereof.

OBJECTS AND SUMMARY OF THE INVENTION

It is an object of the invention to provide an improved controller arm which overcomes the aforementioned disadvantages and difficulties.

It is another object to provide an improved articulated controller arm for controlling a remotely related segmented slave arm.

Another object is to provide in a manipulator system having a slave arm an articulated controller arm comprising a miniature kinematic replica of the slave arm.

It is another object to provide for use in a manipulator system an improved controller arm characterized by a segmented controller shaft, each segment of the shaft being configured and dimensioned to form a miniature kinematic replica of a corresponding segment of a segmented slave arm supported for performing a variable task at a remotely related work site.

It is another object to provide in an articulated control arm a skeletal body including a plurality of pivotal segments supported against gravitation by cantilevered counterweights.

It is another object to provide a manually operable controller arm for controlling a remotely related slave arm characterized by a plurality of electrical potentiometers for providing output signals indicative of angular displacement imparted to segments of the arm about a plurality of intersecting axes.

Another object is to provide in a manipulator system characterized by an articulated slave arm having a plurality of pivotally connected segments for performing a variable task at a work site located in celestial space, an improved articulated controller arm, not necessarily restricted to use in such systems, since the improved articulated controller arm may enjoy equal utility in a terrestrial environment.

These and other objects and advantages are achieved through the use of a counterbalanced, segmented controller arm having seven degrees-of-motion including a segmented controller shaft configured and dimensioned to form a miniature kinematic replica of a slave arm. The slave arm includes a shoulder joint for affording adjacent segments of the arm mutually relative angular displacement about a first pair of intersecting axes, an elbow joint for affording adjacent segments of the arm mutually relative angular displacement about a second pair of intersecting axes, a wrist joint for affording adjacent segments of the arm mutually relative angular displacement about a third pair of intersecting axes, and a rotatable terminal or end effector, as will become more readily apparent in view of the following description and claims, in light of the accompanying drawings.

DETAILED DESCRIPTION OF THE PREFERRED EMBODIMENT

Figure 1:
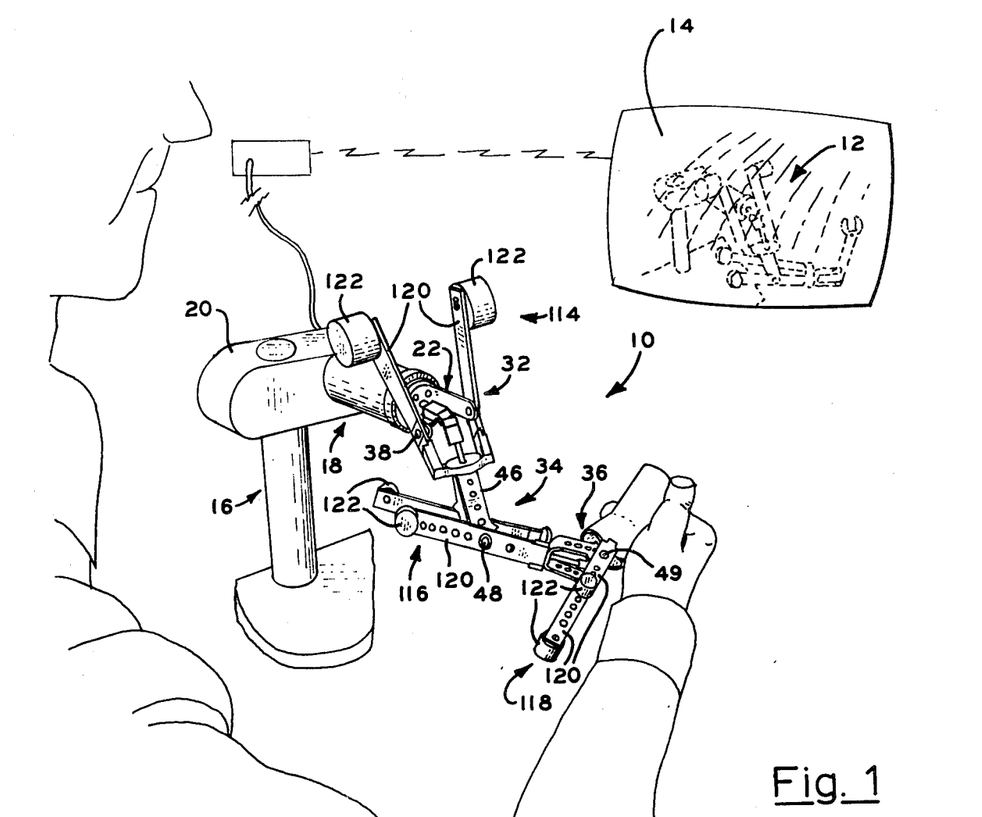
FIG. 1 is a perspective view of an articulated control arm which embodies the principles of the instant invention, depicted in an operative environment in which is controlled a slave arm.

Referring now to the drawings with more particularity wherein like reference characters designate like or corrsponding parts throughout the several views, there is shown in FIG. 1 an improved articulated controller arm, generally designated 10, which embodies the principles of the instant invention.

As illustrated in FIG. 1, the controller arm 10 is included in a manipulator system which includes, as well as a controller arm 10, a slave arm, generally designated 12. As a practical matter, the controller arm 10 comprises a miniature kinematic replica of the slave arm 12, in that the controller arm and the slave arm are similarly articulated for facilitating the imparting of similar rates of motion about similar axes of freedoms of motion.

However, it is important to appreciate that the controller arm and slave arm are, where desired, differently dimensioned and, preferably, are of different construction. For example, the slave arm 12 may conform to the shape of the controller arm or, where desired, conform to the shape of the arm shown in the aforementioned Application for U.S. Letters Patent. However, for the sake of convenience, the slave arm 12, as shown, conforms generally to the shape of the controller arm 10, as illustrated in FIG. 1.

For facilitating control of the slave arm, as depicted in FIG. 1, the slave arm 12 is electronically reproduced on a video screen 14, provided at an operator's console. However, a use of electronic circuitry is not required where the slave arm and the controller arm are disposed in close proximity and interconnected through a hard line link.

Figure 3:
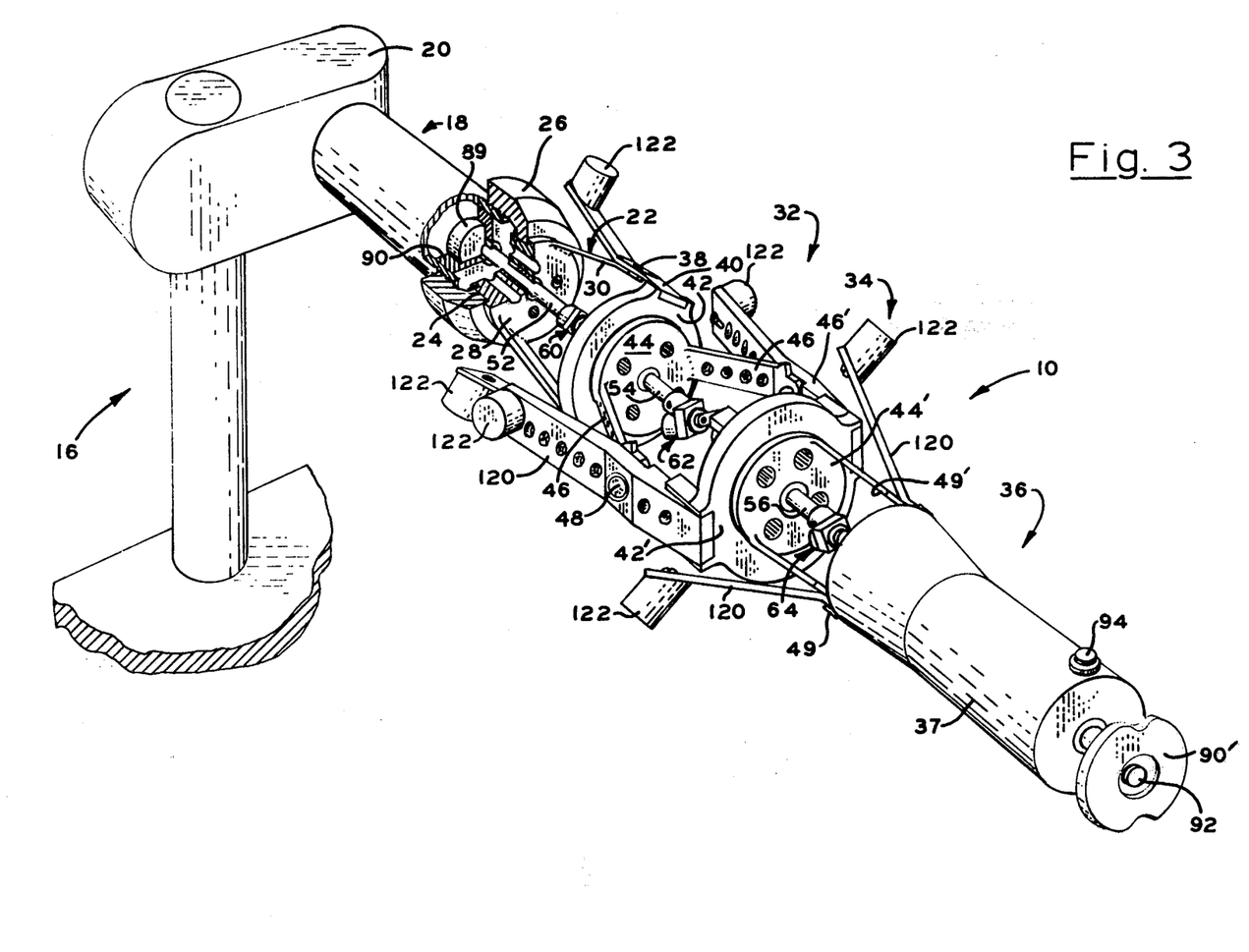
FIG. 3 is a perspective view, on somewhat of an enlarged scale, of the controller arm shown in FIG. 1.

Turning now to FIG. 3, the controller arm 10 preferably is mounted on a pedestal, generally designated 16, and positioned to afford ready access thereto by an operator situated to observe an operation of the slave arm 12, either through direct visual contact or electronically.

Mounted upon the base 16 is a horizontally oriented base segment 18. As shown, the base segment projects from an anchor block 20 and is affixed to the pedestal employing any suitable means, not shown. Connected at the distal end of the base segment 18, in spaced relation with the anchor block 20, is the controller arm 10. The controller arm 10 is supported by a base yoke 22 for rotation about an axis coincident with the longitudinal axis of the base segment 18 and is connected therewith through an annular bearing 24. As a practical matter, the bearing includes an annular lip received in an annular groove. The lip is defined within an anchor cap 26 threaded or otherwise united with the base segment 18, while the groove is formed about the periphery of the base plate 28, FIG. 1. This plate serves as a rotatable mount for the arm 10, so that the arm is supported by the base plate 28 for rotation about an axis, designated $A_1$, FIG. 4, coincident with the longitudinal axis of symmetry for the base segment 18.

As shown, the base yoke 22 includes a pair of legs 30 affixed to and extended in substantially coplanar relation from the base plate 28. These legs diverge as they extend away from the base plate 28. The extended end portion of the base yoke 22 serves as a mount for an adjacent yoke 32, which for the sake of simplification is hereinafter referred to as the shoulder yoke. The shoulder yoke 32, in turn, pivotally supports an adjacent yoke, designated 34, hereinafter referred to as an elbow yoke, to which is pivotally affixed still another yoke 36, referred to as a wrist yoke.

The yokes 32 and 34 are of similar design and configuration, while the base yoke 22 and the wrist yoke 36 are of slightly different configurations since these yokes are located at the opposite ends of the arm 10.

Figure 4:
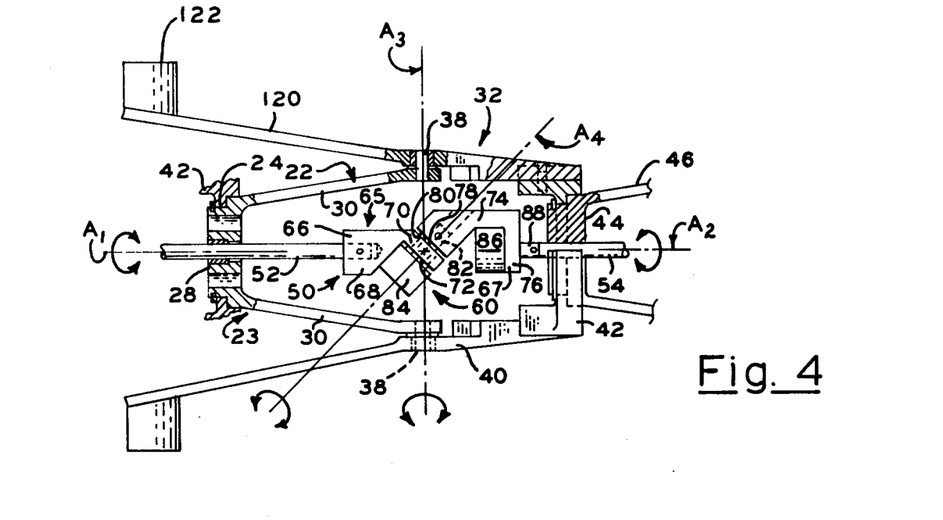
FIG. 4 is a partially sectioned view of one segment of the controller arm shown in FIG. 3.

As shown in FIG. 4, the legs 30 of the base yoke 22 are supported at their base ends by the base plate 28 for rotational displacement and are pivotally connected at their distal ends with the adjacent shoulder yoke 32. The legs 30 are connected to the shoulder yoke 32 by suitable coaxially aligned bearing pins 38 which accommodate relative pivotal motion between the yokes 22 and 32, about an axis designated $A_3$, disposed in a plane orthogonally related to axis $A_1$.

The shoulder yoke 32, in turn, includes a pair of converging legs 40 which terminate in an annulus 42. This annulus serves to capture a dish-shaped base plate 44 and supports the plate for angular displacement about an axis, designated $A_2$.

The base plate 44, like the base plate 28, serves to support a pair of diverging legs, designated 46. The diverging legs 46 are included in the yoke 32 and are pivotally connected to a pair of generally converging legs 46' of the elbow yoke 34, through coaxially aligned bearing pins 48. The pins 48 are similar in design and function to the bearing pins 38. The yoke 34 includes an annulus 42', integrally connected with the legs 46', which serves to capture a rotatable base plate 44. Thus it will be appreciated that the legs 46 serve to connect the yoke 32 with the elbow yoke 34 and accommodate relative pivotal displacement therebetween. Finally, the elbow yoke 34 is connected to the wrist yoke 36 employing coaxially aligned bearing pins 49, similar in design and function to the bearing pins 48 in that these pins pivotally connect a pair of legs 49' projected from the rotatable base plate 44' to the wrist yoke 36 which comprises the terminal yoke.

In view of the foregoing, it should be apparent that the controller arm 10 comprises a plurality of yokes which serve as articulated segments, each being afforded angular displacement about a pair of orthogonally related axes, relative to each adjacent segment.

The rotation for each of the yokes about the axes $A_1$, $A_2$ and $A_3$ is sensed through a use of a segmented controller shaft 50, FIG. 5, the purpose of which is to drive a plurality of motion sensing potentiometers, as will hereinafter be more readily understood.

The controller shaft 50 includes a first segment 52, referred to as a base segment, a second segment 54, referred to as a shoulder segment, a third segment 56, referred to as an elbow segment, and a fourth segment 58, designated a wrist segment.

The segments 52 through 58 of the controller shaft 50 are substantially concentrically related to the yokes 22, 32, 34 and 36, and are conterminous therewith. The yokes, of course, serve as a skeletal support for the controller shaft 50. Moreover, it is to be understood that the segments of the shaft 50 are connected in end-to-end relation through a series of similarly configured joints, designated 60, 62 and 64. The segments 52 and 54 of the shaft 50 are connected through the joint designated 60, herein referred to as the shoulder joint, the segments 54 and 56 are connected through the joint designated 62, herein referred to as the elbow joint, while the segments 56 and 58 are connected through a joint designated 64, herein referred to as a wrist joint.

It is to be understood that the shoulder joint 60 typifies the joints interconnecting the segments of the controller shaft 50, and, therefore, a detailed description of the joint 60 is deemed sufficient to provide for a complete understanding of the invention.

Figure 5:
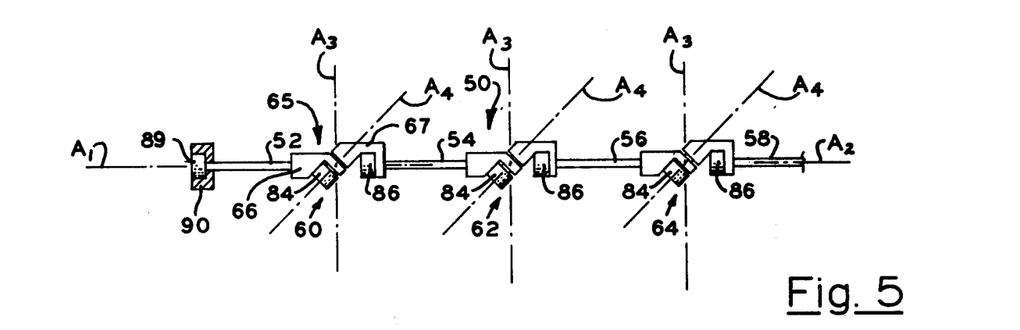
FIG. 5 is a side elevational view of a segmented controller shaft included within the arm shown in FIGS. 1 and 3.

The joint 60, as shown, includes a knuckle 65 having a first knuckle-half 66 as well as a second knuckle-half 67, more clearly shown in FIG. 5. The first knuckle-half 66 comprises a nipple 68, FIG. 4, pinned to the base segment 52 of the shaft 50 and an integrally related angulated bracket member 70. The bracket member 70 is provided with a planar surface 72, the plane of which is extended to define an included angle of 45° with the axis $A_1$ of the shaft segment 52.

Immediately adjacent the bracket member 70 there is disposed the second knuckle-half 67. This knuckle-half also includes a bracket member, designated 74, which terminates in a bearing support 76. The bearing support 76 also includes a planar surface which is orthogonally related to the longitudinal axis of symmetry for the shoulder segment 54 of the controller shaft 50.

The first knuckle-half 66 includes a bearing surface 78 which is adjacently related to a bearing surface 80 provided for the second knuckle-half 67. The planes of the bearing surfaces 78 and 80 extend at an angle of 45° with respect to the longitudinal axia $A_1$ of the base segment 52 of the controller shaft 50. The bearing surfaces 78 and 80 serve to accommodate mutual relative angular displacement of the knuckle-halves 66 and 67 about a common axis, designated $A_4$. This axis is normally related to the bearing surfaces and is extended at 45° with respect to the axes $A_1$ and $A_2$ of segments 52 and 54 of the controller shaft 50.

It is also important to note that the axes $A_1$, $A_2$, $A_3$ and $A_4$ all intersect at a common point so that as the yoke 32 is pivoted about axis $A_3$, relative to the yoke 22, the knuckle-half 67 is afforded rotation about the axis $A_4$, relative to the knuckle-half 66. However, in order to accommodate mutually relative rotation of the knuckle-halves 66 and 67, as the yokes are pivoted about the axis $A_3$, mutual relative angular displacement of both adjacent segments 52 and 54 of the shaft 50 must occur, in a simultaneous fashion, otherwise the joint 60 would tend to "lock up".

Relative angular displacement of the bracket members 70 and 74 is facilitated by a shaft 82 projected from a potentiometer 84 mounted on the bracket member 70. The shaft 82 projects perpendicularly through a suitable bore, not designated, extended through the planes of the surfaces 78 and 80, and is pinned to the bracket member 74. As a practical matter, the potentiometer 84 is rigidly affixed to the bracket member 70 while the shaft 82 is free to rotate with respect thereto. The shaft 82 also serves as a support shaft for a potentiometer wiper blade, not shown. It is to be understood that the potentiometer 84 is of a known design and that the wiper blade thereof is supported for movement along a resistance, connected to a suitable voltage source, designated V, FIG. 2, and functions as a voltage divider for picking-off a position indicating signal. The voltage value of the signal thus picked-off is indicative of the relative position of the wiper blade to the resistance, and hence the signal serves to indicate the positional relationship of the shaft 82 relative to the knuckle-half 66. Therefore, it will be appreciated that the shaft 82 not only serves as a pivotal coupling for the knuckle-halves 66 and 67, whereby mutual relative angular displacement is accommodated, it also serves as a support shaft for a potentiometer wiper blade adapted to function as a position indicating signal pick-off arm, whereby the positional relationship of adjacent segments of the controller shaft 50 are sensed.

In a similar fashion, a potentiometer 86 is mounted on the bearing support 76 of the knuckle-half 67 with its shaft, designated 88, being extended through the support and pinned to the shoulder segment 54 of a controller shaft 50. Consequently, it will be appreciated that the shaft 88 of the potentiometer 86 serves for coupling the shaft segment 54 with the bracket member 74, whereby rotary displacement of the shaft segment 54 relative to the bracket member 74 is accommodated. Moreover, the shaft 88, like the shaft 82, serves as a support for a potentiometer wiper blade adapted to function as a signal pick-off arm for providing a signal, the voltage value of which is indicative of the relative position of the segment 54 of the controller shaft 50, relative to the bracket member 74.

The joints 62 and 64 also are provided with pairs of potentiometers typified by the potentiometers 84 and 86. Moreover, each of the potentiometers 84 and 86 is connected with the voltage source V, in a suitable manner, not shown. Thus, the potentiometers 84 and 86 cooperate to provide a pair of electrical output signals each having a voltage the instantaneous value of which is indicative of the relative positions of adjacent segments of the controller shaft 50 as angular displacement occurs. Such displacement occurs as angular displacement is imparted to the associated yokes about the axes designated $A_1$, $A_2$ and/or axis $A_3$, accommodated by the inclined relationship of axis $A_4$.

Finally, a potentiometer 89 is mounted on a bracket 90 fixed within the base segment 18 of the arm 10 and is connected with the base segment 52 of the controller shaft 50 for providing a position indicating signal having an instantaneous voltage indicative of the positional relationship of the controller shaft segment 52 about an axis coincident with the longitudinal axis of symmetry of the base segment 18.

Figure 6:
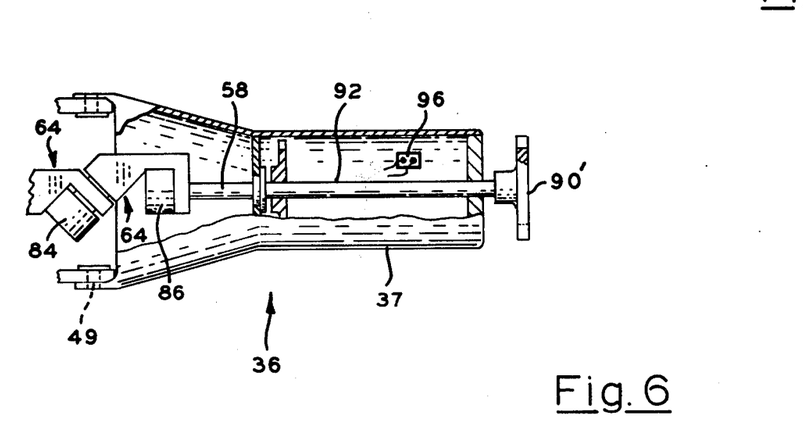
FIG. 6 is a cross-sectional view of the distal end segment of the arm shown in FIG. 3.

Also, as best shown in FIG. 6, potentiometer 86 of the joint 64 is connected with a manipulatable disk 90' through a terminal shaft segment 92 which projects axially through the distal end of the grip 37. Simply by rotating the disk 90', rotary motion is imparted to the shaft segment 92 whereupon an electrical signal having a voltage indicative of the rotation of the shaft segment 92 is provided by the potentiometer 86 and transmitted to the slave arm 12 for imparting angular displacement to the distal end of the slave arm. While not shown, a mechanical lock and override is, where desired, provided so that the shaft segment 92 is releasably locked to the grip 37.

Additionally, a switch button 94 is provided to project from the grip 37 in a position to be manipulated for controlling a switch 96 provided for controlling the operation of an effector, not designated, in any suitable manner, provided at the distal end of the slave arm. Since the effector forms no specific part of the instant invention, a detailed description thereof is omitted in the interest of brevity.

Even though the specific details of the slave arm 12 form no part of the instant invention, it should be appreciated that the controller arm 10 is, in effect, a miniature kinematic replica of the slave arm 12. Therefore, the slave arm 12 also includes a shoulder joint, an elbow joint and a wrist joint and also is afforded seven degrees-of-freedom. In order to achieve the desired movement of the slave arm 12, each of the joints thereof is provided with an assembly including a slave motor for purposes of angularly displacing segments of the slave arm.

Figure 2:
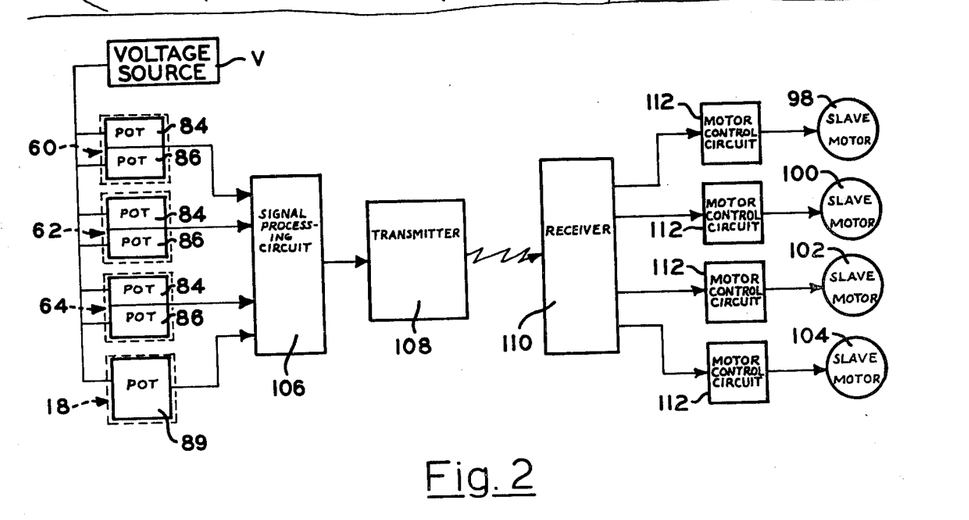
FIG. 2 is a block diagrammatic view illustrating circuitry included within the articulated controller arm for controlling a remotely related slave arm.

For example, a slave motor 98 is provided for controlling the segments of the slave arm about a shoulder joint, FIG. 2, a slave motor 100 is provided for angularly displacing segments of the slave arm about the elbow joint, while a slave motor 102 is provided for angularly displacing segments of the slave arm about a wrist joint. Hence, position indicating signals derived from the potentiometers 84 and 86 of the shoulder joint 60 are utilized to provide control signals to be transmitted and applied to the motor 98, position indicating signals provided by potentiometers 84 and 86 of the elbow joint 62 are utilized to provide control signals to be transmitted and applied to the slave motor 100, position indicating signals provided by the potentiometers 84 and 86 of the wrist joint 64 are utilized to provide control signals to be transmitted and applied to the slave motor 102, while position indicating signals provided by the potentiometer 89 located within the base segment 18 are utilized to provide control signals to be transmitted and applied to the motor 104.

Since the electronic circuitry employed in processing position indicating signals, provided by the potentiometers 84 and 86, and transmitting control signals may be varied as desired and/or is dictated by operational parameters, a detailed description of the circuitry employed is omitted in the interest of brevity. However, it is to be understood that where the slave arm 12 is disposed in a celestial space environment and the controller arm 10 is located aboard a spacecraft or in a terrestrial environment, the circuitry includes a signal processing circuit 106 which serves to process position indicating signals derived from the potentiometers 84 and 86 provide resulting control signals to be conducted to a suitable transmitter 108. The signals are transmitted via the transmitter 108 to a receiver 110 located in the vicinity of the slave arm 12. The signals are then conducted through suitable leads to motor control circuits 112 and ultimately applied to the slave motors 98 through 104.

Of course, where the slave arm 12 is located in a celestial space environment, while the controller arm 10 is operated at a terrestrial location, a great distance exists between the transmitter 108 and the receiver 110. Such distances frequently introduce a transmission delay in the order of several minutes. Thus the motion of the slave arm 12 necessarily lags behind the operation of the controller arm 10 a period determined by the magnitude of the delay encountered in transmitting signals between the receiver and the transmitter. As a consequence, an operator is required to move the controller arm 10 incrementally and then to wait until the slave arm 12 "catches up". Hence, it may be found necessary for the controller arm 10 to remain stationary or in a state of quiescence for several minutes between periods of motion. It is highly desirable, therefore, to provide a capability for releasing the controller arm during periods of quiescence in which the controller arm must remain stationary, since fatique and/or unintentional motion of the operator's arm may result in an aborted mission, particularly in those instances where the limits to which the slave arm safely can be moved becomes a critical factor in performing a task at a celestial space station.

Due to the fact that the controller arm 10, when employed in a terrestrial environment, is continuously subjected to gravity, inclusion of a motion restraint mechanism has been found to be highly desirable. While a use of brakes may prove to be satisfactory from some purposes, it can be appreciated that because of the effort normally required to release or otherwise overcome the effects of a braking system, a use of so-called brakes simply is not practical, particularly where the throw or limits of motion of the slave arm are critical.

Hence, the controller arm 10 is provided with a counterbalancing system the purpose of which is to counterbalance the arm, in all positions of operation, in order to eliminate gravitation or motion resulting from the effects of gravity.

The counterbalancing system, as best shown in FIG. 1, includes a plurality of counterbalancing assemblies, generally designated 114, 116 and 118. Each of the counterbalancing assemblies includes a pair of legs 120 projectable from one of the yokes toward the base segment 18 of the controller arm 10. Mounted on the extended end of each leg is a mass 122. It should be apparent that the mass of each of the legs 120 serves to establish a moment acting about an axis $A_3$, in opposition to a moment established by the weight of the arm 10 acting about the axis. Consequently, the masses 122 acting through the moment arm established by the legs 120 produce for the related yoke a moment about an axis $A_3$ which is equal and opposite to the moment produced by the weight of the arm 10 acting about the same axis. Therefore, the weight of the masses 122 acting through the length of the legs 120 of the counterbalancing assembly 114 produces a moment about the axis $A_3$ passing through the bearing pins 38 equal to the moment produced by the weight of the yokes 32, 34 and 36 acting about the axis. The counterbalancing assembly 116 serves to establish a moment acting about the axis $A_3$ passing through the bearing pins 48 equal to the moment produced about the same axis by the weight of the extended portion of the arm 10 including the wrist yoke 36 and the elbow yoke 34. Similarly, the moment produced by the masses 122 acting through the legs 120 of the counterbalancing assembly 118 produces a moment about the axis $A_3$ passing through the bearing pins 49 equal to the moment produced by the weight of the wrist yoke 36 acting in opposition thereto.

It should now be understood that it is possible to counterbalance the segments of the controller arm 10 in any position relative to the forces of gravity acting on the arm. Moreover, the counterbalancing masses produce a desired motion restraining effect which obviates the necessity of employing complex and heavy braking systems.

OPERATION

It is believed that in view of the foregoing description, the operation of the device will readily be understood, however, the operation will at this point be briefly reviewed.

With the controller arm 10 situated in a terrestrial space environment and subject to the effects of gravity of a high order, and the slave arm 12 situated in a celestial space environment and subjected to gravity of a relatively low order, the arms of the manipulator system are connected through an electronic link established between the transmitter 108 and the receiver 110.

The slave arm 12 is caused to respond to energization of the slave motors designated 98 through 104 which, as a practical matter, are energized in response to control signals applied to the motor control circuits 112, via the receiver 110.

The control signals transmitted to the receiver 110 via the transmitter 108 are generated in response to position indicating signals provided by the potentiometers 84 and 86 located within the shoulder joint 60, the elbow joint 62 and the wrist joint 64 as well as by the potentiometer 89 disposed within the base segment 18 of the controller arm 10, all being connected with the voltage source V. Since the potentiometers 84, 86 and 89 are of conventional design and are adapted to function as voltage dividers in a manner well understood by those familiar with potentiometers, a detailed discussion of the operation of the potentiometer is omitted in the interest of brevity.

It will, of course, be recalled that the base yoke 22 is supported for rotation about axis $A_1$, which is coincident with the longitudinal axis of the base segment 18 of the arm. The shoulder yoke 32, in turn, is supported to be rotated about the axis $A_1$, as well as to be pivoted about axis $A_3$. Consequently, the shoulder yoke 32 is supported for angular displacement about a pair of orthogonally related axes $A_1$ and $A_3$, sequentially or simultaneously, as desired.

The displacement imparted to the yoke 32, relative to the yoke 22, at the joint 60, is sensed by the potentiometers 84 and 86 connected to the controller shaft segments 52 and 54, at the knuckle-halves 66 and 67 of the knuckle 65. Angular displacement of the yoke 32, about the axis $A_3$, is accommodated, provided, of course, that simultaneous angular displacement of the knuckle-halves 66 and 67 about axes $A_1$ and $A_2$, FIG. 4, is accommodated. Relative motion thus is imparted to the shaft segments 52 and 54, as a consequence of the pivotal displacement of the yoke 32, relative to the yoke 22. This relative motion of the shaft segments 52 and 54 causes the wiper blades of the potentiometers 84 and 86 to pick-off and thus provide electrical signals having voltage values indicative of the positional relationship of the shaft segments. These signals are conducted to the signal processing circuit 106 for initiating generation of control signals to be conducted to the transmitter 108 for transmission to the receiver 110, FIG. 2.

Similarly, the yoke 34 is supported for pivotal motion at the elbow joint 62 about an axis $A_3$ and rotary motion about an axis $A_1$, normally related to the axis $A_3$, passing through the bearing pins 48. Hence, it should be clear that the joint 62 is similar in design and function to the joint 60 and accommodates mutual relative rotation between the yokes 32 and 34. Mutual rotation and angular displacement of the yokes 32 and 34 are sensed by the potentiometers 84 and 86 with resulting position indicating signals being applied to the signal processing circuit 106 at which control signals are provided and from which the control signals are conducted to the transmitter 108 for transmission to the receiver 110, all in a manner similar to that previously described with respect to the operation of the shoulder joint 60.

In a similar manner, the potentiometers 84 and 86 of the wrist joint 64 sense pivotal motion imposed on the yokes 34 and 36, with the resulting potentiometer output signals being conducted to the signal processing circuit 106 preparatory to transmission to the receiver 110 of control signals. Finally, rotary motion imparted to the disk 90' is sensed by the potentiometer 86 connected to the shaft 92, whereupon control signals are responsively provided for transmission to the receiver 110 via the signal processing circuit 106. The final rotary motion imparted to the shaft segment 52 is sensed by the potentiometer 89 located in the base segment 18, with an attendant result of control signals being transmitted through the circuitry to the receiver 110.

The receiver 110, of course, includes a signal processing circuit which serves to receive control signals from the transmitter 108 and provide an output to the motor control circuits 112 for thus energizing the slave motors 98 through 104 in a manner dictated by the control signals received by the receiver 110.

In view of the foregoing, it should readily be apparent that the controller arm 10 comprises an articulated controller arm characterized by a segmented controller shaft including a plurality of controller segments, each segment of the plurality being configured and dimensioned to form a miniature kinematic replica of a corresponding segment of a slave arm supported for angular displacement about a plurality of axes so that in effect each of the segments is supported through joints which accommodate directional motion about orthogonal axes, whereby seven degrees-of-motion corresponding to motion normally attributable to the human arm is achieved. The segments of the arm are counterbalanced for obviating the effects of gravity utilizing simplified and economic counterbalancing assemblies, without attendant disadvantages characterizing a use of brakes.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In a manipulator system characterized by an articulated slave arm having a plurality of pivotally connected segments for performing a variable task at a work site, and a controller remotely related to the work site and connected to the slave arm, the improvement comprising:

an articulated controller arm characterized by a segmented controller shaft including a plurality of controller shaft segments, each segment of said plurality being configured and dimensioned to form a miniature kinematic replica of a corresponding segment of the slave arm and supported for relative angular displacement about a pair of intersecting axes duplicatable by the slave arm, said pair of axes intersecting and defining therebetween a constant included angle of 45°;

an articulated skeletal body for supporting said controller shaft including a plurality of pivotal segments symmetrically related to said controller shaft and supported for angular displacement about pivotal axes normally related to one axis of said pair of intersecting axes.

2. The improvement of claim 1 wherein at least one segment of said plurality of pivotal segments includes a pair of coaxially aligned sections, each section of said pair being supported for angular displacement relative to the other section of the segment about an axis common thereto.

3. The improvement of claim 2 further comprising motion restraint means for restraining each of the pivotal segments of the skeletal body against gravitation about said pivotal axes.

4. In a manipulator system characterized by an articulated slave arm having a plurality of pivotally connected segments for performing a variable task at a work site, and a controller remotely related to the work site and connected to the slave arm, the improvement comprising:

A. an articulated controller arm characterized by a segmented controller shaft including a plurality of controller shaft segments, each segment of said plurality being configured and dimensioned to form a miniature kinematic replica of a corresponding segment of the slave arm and supported for relative angular displacement about a pair of intersecting axes duplicatable by the slave arm;

B. an articulated skeletal body for supporting said controller shaft including a plurality of pivotal segments symmetrically related to said controller shaft and supported for angular displacement about pivotal axes normally related to one axis of said pair of intersecting axes;

C. at least one segment of said plurality of pivotal segments including a pair of coaxially aligned sections, each section of said pair being supported for angular displacement relative to the other section of the segment about an axis common thereto;

D. motion restraint means for restraining each of the pivotal segments of the skeletal body against gravitation about said pivotal axes;

E. said motion restraint means including a counterbalancing mass rigidly affixed in cantilevered relation to each segment of said skeletal body and characterized by a moment acting about the pivotal axis in opposition to the moment of the mass of the arm about the pivotal axis.

5. The improvement of claim 4 further comprising means for providing a plurality of electrical signals indicative of the instantaneous angular relation of the segments about said pair of axes, said means for providing a plurality of electrical signals including a pair of electrical potentiometers connected with each segment of the controller shaft for providing an output voltage varying proportionally with relative angular displacement of the segment.

6. A manually operable controller for a remotely related articulated slave arm having a terminal effector and characterized by a plurality of slave arm segments, each being angularly displaceable about a pair of axes, comprising:

A. a segmented controller shaft comprising a miniature kinematic replica of the slave arm including means defining a shoulder joint for affording adjacent segments of the arm mutually relative angular displacement about a first pair of intersecting axes, means defining an elbow joint for affording adjacent segments of the arm mutually relative angular displacement about a second pair of intersecting axes, means defining a wrist joint for affording adjacent segments of the arm mutually relative angular displacement about a third pair of intersecting axes, and means defining a base joint for affording said segments angular displacement about a common axis;

B. a rotatable terminal shaft including signal generating means for providing effector control signals for controlling the terminal effector of the slave arm;

C. signal generating means for generating electrical signals indicative of mutually relative angular displacement imparted to adjacent segments of said controller shaft;

D. means including a body for housing said controller shaft including a shoulder yoke supported for simultaneous angular displacement about a pair of orthogonally related axes passing through the shoulder joint, an elbow yoke supported for simultaneous angular displacement about a pair of orthogonally related axes passing through the elbow yoke, and a wrist yoke supported for simultaneous angular displacement about a pair of orthogonally related axes passing through said wrist joint; and E. means for restraining each of said yokes against gravitation, including a cantilevered mass affixed to each of the yokes characterized by a moment acting in opposition to the moment of the arm acting about one axis of the pair of orthogonally related axes about which the yoke is supported for angular displacement.

7. The controller of claim 6 wherein said signal generating means comprises a pair of electrical potentiometers connected in a signal transmission circuit and mounted in each of the joints.

8. In a manipulator system characterized by an articulated slave arm having a plurality of pivotally connected segments and adapted to perform a variable task at a work site, an improved, manually operable controller arm characterized by seven degrees-of-freedom comprising:

A. a segmented controller shaft comprising a miniature kinematic replica of the slave arm including means defining a first joint for affording adjacent segments of the shaft simultaneous angular displacement about a first pair of intersecting axes, means defining a second joint for affording adjacent segments of the shaft simultaneous angular displacement about a second pair of intersecting axes, means defining a third joint for affording adjacent segments of the shaft simultaneous angular displacement about a third pair of intersecting axes and means defining a base joint for affording all of the segments simultaneous angular displacement about a further axis;

B. output means located at each of said joints and connected with the segments of the shaft for providing an electrical output indicative of relative angular displacement of the segments of the controller shaft;

C. a plurality of yokes pivotally connected for mutual relative angular displacement about pivotal axes supporting the segments of the shaft, and counterbalancing means for restraining the segments of the shaft against gravitation-induced displacement.

9. The controller arm of claim 8 wherein each yoke is supported for rotation about a rotary axis normally related to the pivotal axis.

10. The controller arm of claim 9 wherein said output means includes a first potentiometer having a wiper blade support shaft the axis of which bisects the included angle defined by said rotary axis and said pivotal axis and a second potentiometer having a wiper blade support shaft the axis of which is coincident with the rotary axis thereof.

11. The controller arm of claim 10 wherein the counterbalancing means includes a cantilevered mass affixed to each of the yokes, each mass having a moment about the pivotal axis of the yoke to which it is affixed equal to the moment of the arm acting about the axis in opposition thereto.

* * * * *